United States Patent [19]

Shibazaki et al.

[11] 4,159,312

[45] Jun. 26, 1979

[54] CALCIUM CARBONATE POWDERS

[75] Inventors: Hiroji Shibazaki, Amagasaki; Setsuji Edagawa, Nishinomiya; Hisashi Hasegawa, Nishinomiya; Satoshi Kondo, Nishinomiya; Kazuo Ohnawa, Takarazuka, all of Japan

[73] Assignee: Shiraishi Kogyo Kaisha, Ltd., Amagasaki, Japan

[21] Appl. No.: 911,994

[22] Filed: Jun. 2, 1978

[30] Foreign Application Priority Data

Sep. 19, 1977 [JP] Japan .............................. 52/112888
Jan. 17, 1978 [JP] Japan .............................. 53/4002

[51] Int. Cl.² .......................... C01F 5/24; C09C 1/02
[52] U.S. Cl. .................................. 423/268; 423/430; 106/308 B; 106/306

[58] Field of Search ............. 423/265, 266, 267, 268, 423/430, 431, 432; 106/306, 308 M; 260/42.46, 42.43; 526/4

[56] References Cited

U.S. PATENT DOCUMENTS

| | | | |
|---|---|---|---|
| 3,661,610 | 5/1972 | Ferris | 106/306 |
| 3,797,610 | 3/1974 | Windle | 106/306 |
| 3,905,937 | 9/1975 | Khanna | 106/308 M |
| 3,945,843 | 3/1976 | Holty et al. | 106/306 |
| 3,989,195 | 11/1976 | Fallon-Steward | 106/306 |
| 4,072,622 | 2/1978 | Kuhlins | 423/265 |

*Primary Examiner*—O. R. Vertiz
*Assistant Examiner*—Gary P. Straub
*Attorney, Agent, or Firm*—Bierman & Bierman

[57] ABSTRACT

Surface-treated calcium carbonate powders of this invention are easy to handle and highly dispersible in water, give slurries of high concentration and are useful as pigments and various other applications.

10 Claims, No Drawings

CALCIUM CARBONATE POWDERS

This invention relates to surface-treated calcium carbonate powders, processes for preparing such powders, and aqueous slurries of the same.

The term "the average size" of cubic calcium carbonate particles as used in this invention refers to the length of one side of the particles as calculated from the specific surface area thereof according to the BET method.

Calcium carbonate is used for various purposes. Especially aqueous dispersions of calcium carbonate are widely used as pigments for coating paper, pigments for aqueous coating compositions, etc. For example, the calcium carbonate heretofore used as a pigment for coating paper is in the form of noncubic crystals larger than 1.0 μm in average size or microfine cubic particles having an average size of smaller than 0.1 μm. These particles have various drawbacks. The former particles are considerably lower in gloss, whiteness and opacity than those smaller than 0.1 μm in average size and are therefore used merely as undercoat pigments for multi-layer coatings except in special-purpose coatings. On the other hand, particles of the latter type are used in large quantities for high-quality art paper, coated paper and the like because of their high degree of whiteness inherent in calcium carbonate, good amenability to the application of ink and outstanding gloss. However, microfine calcium carbonate particles are still low in opacity and have the serious drawback that aqueous dispersions or coating compositions prepared therefrom in high concentrations are difficult to handle and involve poor dispersibility because of high yield point and apparent viscosity. To ensure the production of coated paper with improved efficiency, it is an important problem for the papermaking industry to use aqueous dispersions having the highest possible calcium carbonate concentration but a reduced viscosity. The results heretofore achieved, nevertheless, are not satisfactory since microfine calcium carbonate particles smaller than 0.1 μm have a high cohesive force and are not dispersible in an aqueous medium in high concentrations. Accordingly microfine calcium carbonate particles less than 0.1 μm are usually used in the form of a dispersion of low concentration prepared by adding a dispersant to an aqueous suspension of such particles and dewatering the same on a filter press to a concentration of about 50% which is not as high as is satisfactory. Alternatively such particles are used as a slurry prepared by pulverizing secondary agglomerates of the particles and dispersing the resulting powder in an aqueous medium containing a dispersant, whereas the slurry gives coatings of greatly reduced gloss. Although commercially infeasible, a powder almost free from secondary agglomerates could be obtained by a special method such as vacuum freeze-drying, but slurries prepared from the resulting powder would be viscous and have a limited concentration of less than 55% even with use of a large quantity of dispersant such as sodium polyacrylate.

Cubic calcium carbonate particles 0.1 to 1.0 μm in average size appear usable free of the drawbacks heretofore experienced with conventional calcium carbonate powders for paper coating. However, it had been impossible to commercially produce calcium carbonate particles of such size and form before we accomplished a process in which an aqueous suspension containing calcium hydroxide and cubic calcium carbonate crystals serving as nuclei for growing cubic crystals and having an average size of less than 1.0 μm is sprayed into a gas containing carbon dioxide at least twice to thereby form cubic calcium carbonate crystals having a uniform size of 0.1 to 1.0 μm. The process is described in the specification of our U.S. Patent application Ser. No. 827,218, the disclosure of which is incorporated herein by reference. The calcium carbonate crystals prepared by the above process, especially those having an average size of 0.1 to 0.3 μm, were found to have outstanding properties as expected for use in paper coating, but the operation was also found to involve difficulties due to the deposition of calcium carbonate crystals on the apparatus and to the bridging thereof when drying the aqueous suspension resulting from the reaction for the recovery of the crystals, and also when pulverizing and screening the dry product. Additionally it was found that the resulting crystals of calcium carbonate still remained to be improved in dispersibility in an aqueous medium. In fact, unless some expediency is resorted to, crystals would clog up portions of the apparatus for performing the above-mentioned steps due to the deposition and/or bridging of crystals, consequently rendering the apparatus inoperative within two or three hours under the worst conditions, while the calcium carbonate crystals fail to give aqueous slurries of high concentrations.

An object of this invention is to provide cubic particles of calcium carbonate which can be recovered from an aqueous suspension in the form of a dry powder product free of bridging or without entailing deposition on the drying, pulverizing, classifying or like device.

Another object of this invention is to provide cubic calcium carbonate particles highly dispersible in water.

Still another object of this invention is to provide aqueous slurries containing cubic calcium carbonate particles in a high concentration.

Other objects and features of this invention will become apparent from the following description.

This invention provides a calcium carbonate powder composition comprising: (i) 100 parts by weight of cubic calcium carbonate particles 0.1 to 0.3 μm in average size, and (ii) 0.1 to 3.0 parts by weight of at least one water-soluble salt of a copolymer of 100 moles of isobutylene and 80 to 150 moles of maleic anhydride, the water-soluble salt having a molecular weight of 10,000 to 30,000.

This invention further provides a calcium carbonate powder composition comprising: (i) 100 parts by weight of cubic calcium carbonate particles 0.1 to 0.3 μm in average size, (ii) 0.1 to 3.0 parts by weight of at least one water-soluble salt of a copolymer of 100 moles of isobutylene and 80 to 150 moles of maleic anhydride, the water-soluble salt having a molecular weight of 10,000 to 30,000, and (iii) 0.3 to 5.0 parts by weight of at least one water-soluble salt of a copolymer of 100 moles of acrylic acid and 5 to 200 moles of maleic acid, the water-soluble salt having a molecular weight of 1,000 to 20,000.

We have conducted extensive research to overcome the problems encountered when recovering a dry powder of calcium carbonate particles 0.1 to 0.3 μm in average size from an aqueous suspension containing such particles as a product. As a result, we have found that the problems can be substantially eliminated by adding a water-soluble salt of a copolymer of isobutylene and maleic anhydride to the aqueous suspension and that the resulting calcium carbonate particles, when used for paper coating, impart greatly improved pick strength to the coated paper obtained. (The copolymer will be hereinafter referred to as "IM".) Our research has further revealed that the addition of a water-soluble salt of a copolymer (hereinafter referred to as "AM") of acrylic acid and maleic acid to the aqueous suspension conjointly with the water-soluble salt of IM gives the resulting calcium carbonate particles a greatly enhanced dispersibility in water in addition to the effect achieved by the use of the IM salt. This invention has been accomplished based on these novel findings.

The invention is practiced with use of an aqueous suspension containing cubic calcium carbonate particles 0.1 to 0.3 $\mu$m in average size. The suspension may be prepared by any process but preferably by the process disclosed in the specification referred to above. The preferable process for preparing the suspension will be described below in greater detail. First, a starting aqueous suspension is prepared from calcium hydroxide and cubic calcium carbonate crystals less than 0.1 $\mu$m in average size. The proportions of the two components of the suspension are variable with the size of the crystals eventually obtained, economy, the scale of the apparatus, etc. Usually about 1 to about 30 parts by weight of calcium hydroxide is used per 100 parts by weight of fine cubic calcium carbonate crystals. (The parts and percentages hereinafter used are all by weight unless otherwise specified.) Crystal growth takes place favorably with an increase in the amount of calcium hydroxide, but with calcium hydroxide present in too great a ratio, the crystallization of calcium carbonate does not proceed predominantly owing to simultaneous nucleation, leading to the aggregation of fine crystals to varying sizes and thus failing to give cubic crystals of uniform size. The amount of calcium hydroxide is preferably about 10 to about 25 parts, more preferably about 15 to about 20 parts, per 100 parts of fine cubic crystals of calcium carbonate. The particle size of calcium hydroxide, although not particularly limited, is preferably 0.05 to 0.15 $\mu$m in view of its relationship with the size of the droplets of the spray. Useful as the cubic calcium carbonate crystals less than 0.1 $\mu$m in average size serving as nuclei or seeds are those prepared by any of the known processes such as the carbonation process. Spindle-shaped or needle-like crystals of calcium carbonate are not suitable to use as nuclei because of the difficulty encountered in giving a product in the form of cubic crystals. With an increase in the concentration of the solids in the suspension, namely of the calcium hydroxide and fine calcium carbonate crystals, the production efficiency generally improves, but too great a solids concentration tends to reduce the effect of spraying and carbonation rate and to yield crystals of non-uniform size. Thus the solids concentration is usually up to about 15%, preferably about 5 to about 10%. The starting aqueous suspension can be prepared by any known method, for example, by preparing an aqueous suspension of fine cubic calcium carbonate crystals and an aqueous suspension of calcium hydroxide and mixing the suspensions together by mechanical agitating means such as a pipeline mixer, high-speed agitator of the turbine type or the like. Alternatively, the desired suspension can be prepared directly by adding the two components to water and mechanically agitating the mixture. A difference in the method of the preparation of the suspension produces no influence on the size and properties of the crystals finally obtained. The aqueous suspension thus prepared has a pH of about 12.8 or higher. To perform the first step of the process for forming cubic crystals, the starting aqueous suspension is sprayed in the form of droplets, 0.2 to 2.0 mm in diameter, into a carbon dioxide-containing gas and is thereby brought into contact with the gas for reaction. The droplets, if less than 0.2 mm in diameter, tend to flow out from the system as entrained in the gas, whereas if in excess of 2.0 mm in diameter, the droplets will not be satisfactorily subjected to carbonation. The concentration of carbon dioxide in the gas is usually at least 20%, although dependent on the solids concentration of the starting aqueous suspension, the size of the droplets, economy, etc. Purified exhaust gas ($CO_2$ concentration: about 30%) resulting from the calcination of limestone is advantageously usable for commercial purposes. The reaction between the starting aqueous suspension and the carbon dioxide-containing gas, which may be conducted at room temperature and atmospheric pressure, can be carried out with heating and/or with application of pressure to ensure promoted crystal growth. The temperature and pressure conditions should be determined from an overall viewpoint with consideration given to the equipment cost, ease of operation, reaction velocity, etc. When the reaction is conducted under elevated temperature and/or pressure, the temperature is usually up to about 70° C., preferably about 40 to about 60° C., and the pressure is usually up to about 2 kg/cm$^2$G. The contact between the droplets of the suspension and the carbon dioxide-containing gas can be effected in a counter-current or concurrent fashion or by mixing or any other desired method. Counter-current contact, which is commercially most advantageous, can be effected for example by spraying the aqueous suspension into a reaction column from its top while causing the carbon dioxide-containing gas to flow upward from the bottom of the column at a superficial velocity in the column of about 0.1 to about 3 m/sec. Stated more specifically, it is preferable to spray an aqueous suspension having a solids concentration of 5 to 10% into the reaction column in the form of droplets 0.2 to 2 mm in diameter at a velocity of 5 to 12 m$^3$/hr per square meter of the column section while causing a gas containing 20 to 30% of carbon dioxide to ascend in countercurrent relation to the spray at a superficial velocity in the column of 2 to 2.5 m/sec. The reaction of the first step is controlled based on the pH of the suspension resulting from the reaction. More specifically, the foregoing conditions are so adjusted that the aqueous suspension will have a pH of 12.0 to 10.5 after the reaction. Under the reaction conditions which will result in a pH of above 12.0, the product has a tendency to contain fine crystals of less than 0.1 $\mu$m and aggregates of such crystals, whereas if the reaction is allowed to proceed to such an extent that the pH lowers to a level below 10.5, greater variations will result in the size of crystals. In the second step of the process for forming cubic crystals, a suspension of calcium hydroxide is further added to the suspension obtained by the first step and containing cubic grown crystals of calcium carbonate, and the mixture is brought into contact in the form of droplets with a gas containing carbon dioxide in the same manner as in the first step to effect further growth of the crystals. The proportions of cubic calcium carbonate crystals and calcium hydroxide in the mixture, i.e. in the combined suspension, the solids concentration of the suspension, the concentration of carbon dioxide in the gas and various reaction conditions are within the same ranges as in the first step. The second step gives cubic crystals of calcium carbonate of uniform size which is at least 0.1 $\mu$m. When cubic calcium carbonate crystals of greater size up to 0.3 μm are desired, the contact of a readjusted suspension with carbon dioxide-containing gas may be repeated a required number of times in the same manner as in the second step. A small amount of an alkali metal bicarbonate such as sodium bicarbonate or potassium bicarbonate may be added to the suspension in the first or second step or the suspensions in the first and the second steps, whereby the growth of cubic calcium carbonate crystals can be promoted. The use of bicarbonate is especially effective when an increased amount of calcium hydroxide is used to form larger crystals. The cubic calcium carbonate crystals then obtained, although larger, are very uniform in size and include a reduced amount of aggregates.

According to this invention, cubic calcium carbonate particles having the desired size of 0.1 to 0.3 μm are prepared by uniformly admixing at least one water-soluble salt of IM to the aqueous suspension and thereafter subjecting the mixture to conventional powder-recovery steps, for example, dewatering the mixture as by a filter press, drying the mixture as by a band dryer, pluverizing the dry mixture as by a hammer mill and classifying the pluverized mixture as by an air classifier. Whereas the powder forming operation including drying, pulverization and classification heretofore involved the deposition and/or bridging of calcium carbonate particles on the apparatus, such detrimental phenomena can be greatly inhibited according to this invention.

Examples of useful IM are those composed of 100 moles of isobutylene and 80 to 150 moles of maleic anhydride and having a molecular weight of about 10,000 to about 30,000. If the proportion of maleic anhydride is less than 80 moles per 100 moles of isobutylene, the copolymer fails to give the resulting calcium carbonate fully improved amenability to the powder forming operation, whereas if the proportion of maleic anhydride is greater than 150 moles, the calcium carbonate powder obtained, when formulated into a coating composition, tends to give reduced gloss to the paper coated with the composition. IM compounds less than 10,000 in molecular weight are difficult to produce stably on a commercial scale. With use of IM compounds higher than 30,000 in molecular weight, the paper coating composition eventually formulated will have an increased viscosity and a pronounced tendency to give reduced gloss to the coated paper obtained. More preferable examples are those composed of 100 moles of isobutylene and 100 to 120 moles of maleic anhydride and having a molecular weight of about 15,000 to about 20,000. The IM compound is used usually in the form of a water-soluble salt such as alkali metal salt or ammonium salt. The water-soluble salt of IM is added to the aqueous suspension in such an amount that about 0.1 to about 3.0%, preferably about 0.1 to about 1.0%, of the salt will be adsorbed by the calcium carbonate powder eventually obtained, based on the weight of the calcium carbonate. The IM salt added to the suspension is usually about 1.2 to 1.7 times the amount to be adsorbed by the calcium carbonate powder. When adsorbed in an amount of less than 0.1% or more than 3.0%, the IM compound fails to effectively inhibit the bridging of calcium carbonate particles, namely to achieve a remarkable improvement in the powder forming operation. The use of IM attains a very outstanding improvement in the operation including drying, pulverization and classification, assuring a continuous operation for at least 300 hours under usual conditions. The IM-treated powder of calcium carbonate prepared by the present process produces the remarkable effect that when the powder is formulated in a paper coating composition, the composition affords about 25 to about 50% higher pick strength than untreated cubic particles of calcium carbonate. Presumably the outstanding improvement is attributable to the weak cohesion of fine particles of calcium carbonate formed, but such cohesion nevertheless in no way imparts reduced gloss to the coated paper.

The water-soluble salts of IM used in the invention are known. The IM salt can be prepared, for example, by polymerizing 100 moles of isobutylene and 80 to 150 moles of maleic anhydride to form IM and dissolving IM into an aqueous solution of ammonia or alkali metal hydroxide to produce a water-soluble salt of IM.

Further according to this invention, at least one water-soluble salt of AM is added to the aqueous suspension containing cubic calcium carbonate particles of uniform particle size of 0.1 to 0.3 μm, in addition to at least one water-soluble salt of IM. This enables the resulting calcium carbonate particles to have a greatly enhanced dispersibility in water in addition to the effect imparted thereto by the use of the water-soluble IM salt, consequently permitting the particles to form aqueous slurries in high concentrations. The water-soluble AM salt may be added to the suspension simultaneous with or before or after the addition of the water-soluble IM salt thereto.

Examples of useful AM compounds are those composed of 100 moles of acrylic acid and about 5 to about 200 moles of maleic acid and having a molecular weight of about 1,000 to about 20,000. If the proportion of maleic acid is below 5 moles or about 200 moles per 100 moles of acrylic acid, the slurry prepared from the resulting calcium carbonate will not have a fully reduced viscosity. AM compounds less than 1,000 in molecular weight are difficult to produce stably on a commercial scale. With the molecular weight exceeding 20,000, the calcium slurry eventually prepared will not have an appreciably reduced viscosity. Examples of more preferable AM compounds are those containing about 30 to about 100 moles of maleic acid per 100 moles of acrylic acid and having a molecular weight of about 2,000 to about 5,000. The AM compound is used usually in the form of a water-soluble salt such as alkali salt or ammonium salt. The water-soluble salt of AM is added to the aqueous suspension in such an amount that about 0.3 to about 5.0%, preferably about 0.5 to about 1.5%, of the salt will be adsorbed by the calcium carbonate powder finally obtained, based on the weight of the calcium carbonate. The AM salt added to aqueous suspension is usually about 1.2 to about 1.7 times the amount to be adsorbed by the calcium carbonate powder. With less than 0.3% of the AM salt present, the slurry will not have an effectively reduced viscosity, whereas use of over 5% of the salt will not result in any reduction in the slurry viscosity either, hence economically unfavorable. The use of AM achieves a very outstanding improvement in the dispersibility of the resulting calcium carbonate in water. The use of a small amount of AM makes it possible to prepare low-viscosity slurries having a concentration of about 70% in large excess of 55% which was conventionally considered to be the upper limit for fine calcium carbonate particles of less than 0.1 μm even with the use of a large amount of known dispersant. Similarly the use of AM achieves a great reduction in the viscosity of slurries having a relatively low concentration. Slurries may be prepared in a high concentration directly from an aqueous suspension having a low concentration and containing cubic calcium carbonate particles of uniform size of 0.1 to 0.3 μm, by adding at least one water-soluble salt of IM and at least one water-soluble salt of AM to the slurry and dewatering the mixture for example by a filter press for concentration. Alternatively cubic calcium carbonate particles having the desired size of 0.1 to 0.3 μm may be prepared first by adding at least one water-soluble salt of IM and at least one water-soluble salt of AM to an aqueous suspension containing 0.1- to 0.3-μm cubic particles of calcium carbonate, followed by ordinary powder-recovering steps, for example, by dewatering the mixture by a filter press, drying the dewatered mixture by a band dryer, pulverizing the mixture by a hammer mill and classifying the pulverized mixture by an air classifier. A slurry of high concentration can be easily prepared immediately before use by adding a desired amount of water to the particles thus produced and stirring the mixture. The calcium carbonate powders of this invention treated with IM and AM and prepared by either of the above processes produce outstanding whiteness, gloss and opacity and can be formulated into slurries having a high concentration but low viscosity because of their high dispersibility. Thus the powders are useful as paper coating pigments and pigments for other aqueous coating compositions and for various other applications.

The water-soluble salts of AM of this invention may be produced, for example, by polymerizing in an aqueous medium 100 moles of acrylic acid and about 5 to 200 moles of sodium maleate in the presence of an initiator such as a persulfate and neutralizing the copolymer.

This invention will be described below with reference to examples.

EXAMPLES 1 TO 3

A. Preparation of aqueous suspension (I) An aqueous suspension composed of fine cubic calcium carbonate particles of 0.08 μm in average size adjusted to a concentration of 5% and to a temperature of 50° C. is fed to a pipeline mixer at a rate of 2000 kg/hr. At the same time, milk of lime adjusted to a concentration of 3.7% and to a temperature of 50° C. is also fed to the mixer at a rate of 500 kg/hr. to mix the slurry and the milk together. Into a reactor through which carbon dioxide having a concentration of 25 vol. % and a temperature of 20° C. is ascending at a superficial velocity of 0.7 m/sec. the mixture is sprayed at a rate of 250 kg/hr. through the top of the reactor. The mixture is thus subjected to carbonation until the reaction mixture has a pH of 10.5 to 11.0.

The first reaction described gives a suspension containing cubic calcium carbonate particles which have grown to an average size of 0.10 μm. Milk of lime adjusted to a concentration of 3.5% and to a temperature of 50° C. is admixed with the suspension, and the mixture is subjected to carbonation under the same conditions as in the first reaction, giving an aqueous suspension (hereinafter referred to as "Suspension I") containing 5% of second reaction product having grown to an average size of 0.11 μm.

(II) The same procedures as above (I) are repeated to obtain an aqueous suspension containing a second reaction product having grown to an average size of 0.11 μm. The same second reaction procedure as above is thereafter repeated twice to obtain an aqueous suspension (hereinafter referred to as "Suspension II") containing 5% cubic calcium carbonate particles having grown to an average size of 0.15 μm.

(III) The same procedures as above (I) are repeated to obtain an aqueous suspension containing a second reaction product having grown to an average size of 0.11 μm. The same second reaction procedure as above is thereafter repeated six times to give an aqueous suspension (hereinafter referred to as "Suspension III") containing 5% cubic calcium carbonate particles having grown to an average size of 0.25 μm.

B. Addition of IM

An aqueous solution of sodium salt of IM (10% in terms of IM concentration) is added to Suspension I in a proportion of 0.5 part of IM per 100 parts (by dry weight) of calcium carbonate. The mixture is fully stirred, dewatered to a calcium carbonate concentration of 50% by a filter press, dried with heating at 80° C., pulverized by a hammer mill and classified by an air classifier, giving an IM-treated calcium carbonate powder 0.11 μm in average size (Example 1). The same procedure as above is repeated with use of Suspension II to obtain an IM-treated calcium carbonate powder 0.15 μm in average size (Example 2), and also with use of Suspension III to obtain an IM-treated calcium carbonate powder 0.25 μm in average size (Example 3).

The IM used is shown in Table 1 below.

Table 1

| | |
|---|---|
| Isobutylene/maleic anhydride mole ratio | 100/110 |
| Molecular weight | about 17,000 |

In each of Examples 1 to 3, at least 300 tons of the pulverized product has been treated by the classifier (capacity:2.0 t/hr.) before the device becomes inoperative due to clogging or bridging of particles.

Subsequently water and a commercially available dispersant consisting substantially of sodium polyacrylate are added to each of the three kinds of calcium carbonate powders to prepare a calcium carbonate slurry having a concentration of 50%. The slurry is formulated into the paper coating composition shown in Table 2 below. The composition is applied on a paper and tested for I.G.T. pick value. Table 3 shows the results.

The I.G.T. pick values given in Table 3 et seq. are measured by an I.G.T. printability tester in accordance with TAPPI Standard T499 Su-64.

Table 2

| | |
|---|---|
| Calcium carbonate powder | 100 parts |
| Starch phosphate (MS# 4600,product of Nihon Shokuhin Kako Co., Ltd., Japan) | 10 parts (as solids) |
| Latex (SN 304, product of Sumitomo Naugatuck Co., Ltd., Japan) | 10 parts (as solids) |
| Dispersant (Alon A-40, product of Toa Gosei Chemical Industry Co., Ltd., Japan) | 1 part (as solids) |

COMPARISON EXAMPLES 1 TO 3

Three kinds of calcium carbonate powders are prepared in exactly the same manner as in Examples 1 to 3 except that IM is not used.

The amount of each powder product handled by the classifier (capacity: 2 t/hr.) is as small as about 2 tons before the device becomes inoperative due to clogging or the bridging of particles.

Water and the same dispersant as used above are added to each of the three kinds of calcium carbonate powders to prepare a slurry having a concentration of 50%, which is then formulated into a paper coating composition in the same manner as in Examples 1 to 3. The composition is applied on a paper and tested for I.G.T. pick value. Table 3 shows the results.

Table 3

|  | Average size ($\mu$m) | I.G.T. pick value (cm/sec.) | Percent improvement in pick value |
| --- | --- | --- | --- |
| Example 1 | 0.11 | 65 | 44 |
| Comp. Example 1 | 0.11 | 45 | — |
| Example 2 | 0.15 | 75 | 30 |
| Comp. Example 2 | 0.15 | 58 | — |
| Example 3 | 0.25 | 76 | 26 |
| Comp. Example 3 | 0.25 | 60 | — |

EXAMPLE 4

An aqueous suspension composed of fine cubic calcium carbonate particles of 0.08 $\mu$m in average size adjusted to a concentration of 5% and to a temperature of 50° C. is fed to a pipeline mixer at a rate of 2000 kg/hr. At the same time, a suspension of calcium hydroxide containing 6.7% of sodium bicarbonate based on the solids of calcium hydroxide and adjusted to a concentration of 3.7% and to a temperature of 50° C. is also fed to mixer at a rate of 400 kg/hr. to mix the suspensions together.

Into a reactor through which carbon dioxide having a concentration of 20 vol.% and a temperature of 25° C. is ascending at a superficial velocity of 0.5 m/sec. the mixture (pH:about 12.8) is continuously sprayed at a rate of 2400 kh/hr. through the top of the reactor to carbonate the milk of lime, contained in the mixture, to a pH of 11.0 to 11.5. A suspension of calcium hydroxide containing 6.76% of sodium bicarbonate based on the solids of calcium hydroxide and adjusted to a concentration of 3.7% and to a temperature of 50° C. is further admixed with the reaction product, and the mixture is subjected to carbonation under the same conditions as in the first reaction. This second reaction procedure is repeated twice, giving cubic calcium carbonate particles of 0.3 $\mu$m in average size.

An aqueous solution of sodium salt of IM (10% in terms of IM concentration) is added to a suspension containing the cubic calcium carbonate particles in a concentration of 5%, in a proportion of 0.5 part of IM per 100 parts of calcium carbonate calculated as solids. The mixture is dewatered on a filter press, dried by heating, pulverized by a hammer mill and then classified by an air classifier, giving a calcium carbonate powder. The same IM as used in Examples 1 to 3 is used.

At least 350 tons of the pulverized product has been treated by the classifier (capacity: 2.0 t/hr.) before the device becomes inoperative.

The calcium carbonate powder obtained is formulated into the same paper coating composition as listed in Table 2. The composition affords a 35%-increase in the pick value in comparison with a corresponding composition prepared from a calcium carbonate powder not treated with IM.

COMPARISON EXAMPLE 4

Cubic calcium carbonate particles 0.15 $\mu$m in average size are prepared in the same manner as in Example 2 except that a sodium salt of IM composed of 100 moles of isobutylene and 60 moles of maleic anhydride is used.

The amount of the powder product handled by the classifier (capacity: 2 t/hr.) is less than 150 tons before the device becomes inoperative due to clogging or the bridging of particles.

EXAMPLES 5 AND 6

Two kinds of calcium carbonate powders in the form of 0.15-$\mu$m cubic particles are prepared in the same manner as in Example 2 except that IM compounds composed of isobutylene and maleic anhydride in the mole ratios of 100:80 (Example 5) and 100:150 (Example 6) are used respectively. In each of the Examples at least 350 tons of the pulverized product has been treated by the classifier (capacity: 2.0 t/hr.) before the device becomes inoperative.

The same paper coating compositions as listed in Table 2 are prepared with the powders prepared above. Each of the compositions is applied by an applicator bar to one face of base paper in an amount of 20 g/m$^2$. The coated paper is then dried in air, stabilized at 20° C. and 60% RH for 24 hours and finished by a super calender. Table 4 shows the viscosity of the coating composition and the properties of the coated paper determined. Table 4 also gives the corresponding values obtained with the use of the calcium carbonate powder prepared in Example 2.

COMPARISON EXAMPLE 5

A calcium carbonate powder in the form of 0.15-$\mu$m cubic particles is prepared in the same manner as in Example 2 except that the IM compound used is composed of 100 moles of isobutylene and 200 moles of maleic anhydride. At least 350 tons of the pulverized product has been treated by the classifier (capacity: 2.0 t/hr.) before the device becomes inoperative.

The same paper coating composition as prepared in Examples 5 and 6 is prepared except that the powder obtained above is used. Similarly base paper is coated with the composition. Table 4 shows the viscosity of the composition and the properties of the coated paper. Apparently the paper has lower gloss than those prepared with use of the calcium carbonate powders obtained in Examples 2, 5 and 6.

Table 4

| CaCO$_3$ | M/I* (Mole ratio) | Viscosity of composition (cps) | White paper test | | |
| --- | --- | --- | --- | --- | --- |
|  |  |  | Gloss (Gs 75%) | Whiteness (%) | Opacity (%) |
| Ex. 5 | 80/100 | 220 | 67 | 92 | 96 |
| Ex. 2 | 110/100 | 212 | 68 | 92 | 96 |
| Ex. 6 | 150/100 | 210 | 67 | 92 | 96 |
| Comp. Ex. 5 | 200/100 | 150 | 60 | 92 | 96 |

*M/I stands for maleic anhydride/isobutylene ratio.

The properties listed in Table 4 et seq. are determined as follows.

Viscosity: apparent viscosity of composition at 30° C. measured with Brookfield type viscosimeter rotating at 60 r.p.m.

Gloss: specular gloss measured with gloss meter at the angle of incidence at 75°.

Whiteness: JIS P 8123-1961

Opacity: JIS P 8138-1963

EXAMPLES 7 AND 8

Two kinds of calcium carbonate powders in the form of cubic particles 0.15 μm in average size are prepared in the same manner as in Example 2 except that the IM compounds used have a molecular weight of about 10,000 (Example 7) and a molecular weight of about 30,000 (Example 8) respectively. In each of Examples, at least 350 tons of the pulverized product has been treated by the classifier (capacity: 2.0 t/hr.) before the device becomes inoperative.

The same paper coating compositions as listed in Table 2 are prepared with use of the powders obtained above. Coated paper is produced in the same manner as in Example 5 with use of each of the compositions and tested for properties. Table 5 shows the viscosity of the composition and properties of the coated paper. The outstanding results achieved are comparable to those attained by the use of the calcium carbonate powder obtained in Example 2.

COMPARISON EXAMPLE 6

A calcium carbonate powder in the form of 0.15-μm cubic particles is prepared in the same manner as in Example 2 except that the IM compound used has a molecular weight of about 40,000. The amount of the powder product treated by the classifier (capacity: 2 t/hr.) is less than 150 tons before the device becomes inoperative.

The same paper coating composition as prepared in Examples 7 and 8 is formulated except that the powder obtained above is used. Similarly base paper is coated with the composition. Table 5 shows the viscosity of the composition and the properties of the coated paper. The composition has a higher viscosity and the gloss of the paper is lower than when the calcium carbonate powders of Examples 7 and 8 are used.

Table 5

| CaCO₃ | Molecular weight of IM | Viscosity of composition (cps) | White paper test | | |
|---|---|---|---|---|---|
| | | | Gloss (Gs 75%) | Whiteness (%) | Opacity (%) |
| Ex. 7 | 10,000 | 200 | 68 | 92 | 96 |
| Ex. 2 | 17,000 | 212 | 68 | 92 | 96 |
| Ex. 8 | 30,000 | 250 | 68 | 92 | 96 |
| Comp. Ex. 6 | 40,000 | 2000 | 60 | 92 | 96 |

COMPARISON EXAMPLE 7

To a suspension containing 5% of cubic calcium carbonate particles 0.08 μm in average size and obtained by the known precipitation process is added an aqueous solution of sodium salt of the same IM as used in Example 1 in a proportion of 0.5 part of IM per 100 parts of the solids of the calcium carbonate. The mixture is thereafter treated in the same manner as in Example 1 to obtain a powder of cubic calcium carbonate particles 0.08 μm in average size.

The same paper coating composition as listed in Table 2 is prepared from the powder. Similarly base paper is coated with the composition. Table 6 shows the viscosity of the composition and the properties of the coated paper. Table 6 also shows the corresponding values afforded by the use of the calcium carbonate powders obtained in Examples 1 to 3. The table indicates that the use of the powder of Comparison Example 7 less than 0.1 μm in average size results in a higher composition viscosity and much lower paper gloss than when the powders according to the invention are used.

COMPARISON EXAMPLE 8

The second reaction procedure of Example 3 is repeated seven times to give a suspension containing 5% of cubic calcium carbonate particles 0.50 μm in average size. An aqueous solution of sodium salt of the same IM as used in Example 1 is added to the suspension in a proportion of 0.5 part of IM per 100 parts of the solids of the suspension. The mixture is thereafter treated in the same manner as in Example 1 to obtain a powder of cubic calcium carbonate particles 0.50 μm in average size.

The same paper coating composition as listed in Table 2 is prepared from the powder. Similarly base paper is coated with the composition. Table 6 shows the viscosity of the composition and the properties of the coated paper. It is seen that the use of the calcium carbonate powder of Comparison Example 8 with a large particle size produces very poor gloss on the coated paper.

Table 6

| CaCO₃ | Size of CaCO₃ particle (μm) | Viscosity of composition (cps) | White paper test | | |
|---|---|---|---|---|---|
| | | | Gloss (Gs 75%) | Whiteness (%) | Opacity (%) |
| Comparative Ex. 7 | 0.08 | 1000 | 50 | 92 | 94 |
| Ex. 1 | 0.11 | 250 | 65 | 92 | 95 |
| Ex. 2 | 0.15 | 212 | 68 | 92 | 96 |
| Ex. 3 | 0.25 | 200 | 67 | 92 | 96 |
| Comp. Ex. 8 | 0.50 | 150 | 53 | 92 | 95 |

EXAMPLE 9

An aqueous suspension containing 5% of cubic calcium carbonate particles 0.11 μm in average size is prepared in the same manner as in Example 1. An aqueous solution of sodium salt of IM (10% in terms of IM concentration) and an aqueous solution of sodium salt of AM (10% in terms of AM concentration) are added to the suspension in proportions of 0.5 part of IM and 1.0 part of AM per 100 parts of the calcium carbonate. The mixture is thoroughly stirred and is thereafter dewatered, dried, pulverized and classified in the same manner as in Example 1, giving a powder of calcium carbonate particles 0.11 μm in average size.

At least 300 tons of the pulverized product has been treated by the classifier (capacity: 2 t/hr.) before the device becomes inoperative due to clogging or the bridging of particles.

The same IM as shown in Table 1 is used. The AM used has the properties given below.

Table 7

| | |
|---|---|
| Maleic acid/acrylic acid mole ratio | 70/100 |
| Molecular weight | about 3500 |

The calcium carbonate powder is formulated into the same paper coating composition as listed in Table 2. The composition is applied by an applicator bar to one face of base paper in an amount of 20 g/m$^2$. The coated paper is then dried in air, stabilized at 20° C. and 60% RH for 24 hours and finished by a super calender. Table 8 shows the viscosity of the composition and the properties of the coated paper obtained.

EXAMPLE 10

A powder of cubic calcium carbonate particles 0.15 μm in average size is prepared in the same manner as in Example 9 except that the aqueous suspension used is obtained in the same manner as in Example 2 and contains cubic calcium carbonate particles 0.15 μm in average size.

More than 300 tons of the pulverized product is treatable with the classifier (capacity: 2 t/hr.) free of any trouble.

The same paper coating composition as in Example 9 is formulated except that the powder obtained above is used. Coated paper is made in the same manner as in Example 9. Table 8 shows the viscosity of the composition and the properties of the paper obtained.

EXAMPLE 11

A powder of cubic calcium carbonate particles 0.25 μm in average size is prepared in the same manner as in Example 9 except that the aqueous suspension used is obtained in the same manner as in Example 3 and contains cubic calcium carbonate 0.25 μm in average size.

More than 300 tons of the pulverized product is treatable with the classifier (capacity: 2 t/hr.) free of any trouble.

The same paper coating composition as in Example 9 is formulated except that the above powder is used. Coated paper is obtained in the same manner as in Example 9. Table 8 shows the viscosity of the composition and the properties of the paper.

COMPARISON EXAMPLE 9

A powder of IM- and AM-treated cubic calcium carbonate particles 0.08 μm in average size is prepared in the same manner as in Example 9 except that the aqueous suspension used contains 5% of commercial cubic calcium carbonate particles obtained by the known precipitation process and having an average size of 0.08 μm.

The powder is formulated into the same paper coating composition as listed in Table 2. Coated paper is obtained in the same manner as in Example 9 with use of the composition. Table 8 shows the viscosity of the composition and the properties of the paper. Because of the reduced particle size of the powder, the composition has an increased viscosity and gives lower gloss to the paper.

COMPARISON EXAMPLE 10

An aqueous suspension is prepared in the same manner as in Example 1-(I), the suspension containing 5% of cubic calcium carbonate particles 0.11 μm in average size. The second reaction procedure in Example 1-(I) is thereafter repeated seven times, giving an aqueous suspension containing 5% of cubic calcium carbonate particles 0.50 μm in average size. Subsequently an aqueous solution of sodium salt of IM (10% in terms of IM concentration) and an aqueous solution of sodium salt of AM (10% in terms of AM concentration) are added to the suspension in proportions of 0.5 part of IM and 1.0 part of AM per 100 parts of the calcium carbonate. The mixture is thoroughly stirred and is thereafter dewatered, dried, pulverized and classified in the same manner as in Example 1, giving a powder of calcium carbonate particles 0.50 μm in average size.

When 300 tons of the pulverized product has been treated by the classifier (capacity: 2 tons/hr.), the device is found still operative free of clogging or bridging of particles.

The powder is formulated into the same paper coating composition as listed in Table 2. Coated paper is prepared in the same manner as in Example 9 with use of the composition. Table 8 shows the viscosity of the composition and the properties of the paper. The table shows that although the composition has a very low viscosity, the paper has very poor gloss.

Table 8

| | Viscosity of | White paper test | | |
|---|---|---|---|---|
| | CaCO$_3$ composition | Gloss | Whiteness | Opacity |
| (μm) | (cps) | (Gs 75%) | (%) | (%) |
| Comp. Ex. 9 | 0.08 | 1000 | 50 | 92 | 94 |
| Ex. 9 | 0.11 | 150 | 65 | 92 | 95 |
| Ex. 10 | 0.15 | 85 | 68 | 92 | 96 |
| Ex 11 | 0.25 | 80 | 67 | 92 | 96 |
| Comp. Ex. 10 | 0.50 | 70 | 53 | 92 | 95 |

EXAMPLES 12 AND 13

Two kinds of calcium carbonate powders composed of cubic particles of 0.15 μm in average size are prepared in the same manner as in Example 10 except that the IM compounds used comprise 80 moles of maleic anhydride (Example 12) and 150 moles of maleic anhydride (Example 13), respectively, per 100 moles of isobutylene. In each of Examples, at least 300 tons of the pulverized product has been treated by the classifier (capacity: 2.0 t/hr.) before the device becomes inoperative.

The same paper coating composition as in Example 9 is formulated except that each of the powders obtained above is used. Coated paper is prepared in the same manner as in Example 9 with use of the composition. Table 9 shows the viscosity of the composition and the properties of the paper.

COMPARISON EXAMPLES 11 AND 12

Two kinds of calcium carbonate powders composed of cubic particles of 0.15 μm in average size are prepared in the same manner as in Example 10 except that the IM compounds used comprise 60 moles of maleic anhydride (Comparison Example 11) and 200 moles of maleic anhydride (Comparison Example 12), respectively, per 100 moles of isobutylene.

The same paper coating composition as in Example 9 is formulated except that each of the powders obtained above is used. Coated paper is prepared in the same manner as in Example 9 with use of the composition. Table 9 shows the viscosity of the composition and the properties of the paper.

In the case of Comparison Example 11, the use of the powder gives reduced viscosity to the composition and good properties to the coated paper, but the amount of the pulverized product treated by the classifier (capacity: 2 t/hr.) is less than 150 tons before the device becomes inoperative.

In the case of Comparison Example 12, the corresponding amount of the pulverized product is as much as at least 300 tons, but the coated paper has reduced gloss.

Table 9

| | M/I (Mole ratio) | Viscosity of composition (cps) | White paper test | | |
|---|---|---|---|---|---|
| | | | Gloss (Gs 75%) | Whiteness (%) | Opacity (%) |
| Comp. Ex. 11 | 60/100 | 110 | 67 | 92 | 96 |
| Ex. 12 | 80/100 | 100 | 67 | 92 | 96 |
| Ex. 13 | 150/100 | 80 | 67 | 92 | 96 |
| Comp. Ex. 12 | 200/100 | 60 | 60 | 92 | 96 |

EXAMPLES 14 AND 15

Two kinds of calcium carbonate powders composed of cubic particles of 0.15 μm in average size are prepared in the same manner as in Example 10 except that the IM compounds used have a molecular weight of 10,000 (Example 14) and a molecular weight of 30,000 (Example 15), respectively. In each of Examples, at least 300 tons of the pulverized product has been treated by the classifier (capacity: 2.0 t/hr.) before the device becomes inoperative.

The same paper coating composition as in Example 9 is formulated except that each of the powders obtained above is used. Coated paper is prepared in the same manner as in Example 9 with use of the composition. Table 10 shows the viscosity of the composition and the properties of the paper.

COMPARISON EXAMPLE 13

A calcium carbonate powder composed of cubic particles of 0.15 μm in average size is prepared in the same manner as in Example 10 except that the IM compound used has a molecular weight of 40,000. The quantity of pulverized product treated by the classifier (capacity: 2.0 t/hr.) is less than 100 tons before the device becomes inoperative.

The same paper coating composition as in Example 9 is formulated except that the powder obtained above is used. Coated paper is prepared in the same manner as in Example 9 with use of the composition. Table 10 shows the viscosity of the composition and the properties of the paper. It is seen that the composition has a high viscosity and that the coated paper has poor gloss.

Table 10

| | Molecular weight of IM | Viscosity of composition (cps) | White paper test | | |
|---|---|---|---|---|---|
| | | | Gloss (Gs 75%) | Whiteness (%) | Opacity (%) |
| Ex. 14 | 10,000 | 80 | 68 | 92 | 96 |
| Ex. 15 | 30,000 | 110 | 68 | 92 | 96 |
| Comp. Ex. 13 | 40,000 | 1500 | 60 | 92 | 96 |

EXAMPLES 16 AND 17

Two kinds of calcium carbonate powders composed of cubic particles of 0.15 μm in average size are prepared in the same manner as in Example 10 except that the AM compounds used comprise 5 moles of maleic acid (Example 16) and 200 moles of maleic acid (Example 17), respectively, per 100 moles of acrylic acid. In each of Examples, at least 300 tons of the pulverized product has been treated by the classifier (capacity: 2.0 t/hr.) before the device becomes inoperative.

The same paper coating composition as in Example 9 is formulated except that each of the powders obtained above is used. Coated paper is prepared in the same manner as in Example 9 with use of the composition. Table 11 shows the viscosity of the composition and the properties of the paper.

COMPARISON EXAMPLES 14 AND 15

Two kinds of calcium carbonate powders composed of cubic particles of 0.15 μm in average size are prepared in the same manner as in Example 10 except that the AM compounds used comprise 2 moles of maleic acid (Comparison Example 14) and 300 moles of maleic acid (Comparison Example 15), respectively, per 100 moles of acrylic acid. In each of Examples, at least 300 tons of the pulverized product has been treated by the classifier (capacity: 2.0 t/hr.) before the device becomes inoperative.

The same paper coating composition as in Example 9 is formulated except that each of the powders obtained above is used. Coated paper is prepared in the same manner as in Example 9 with use of the composition. Table 11 shows the viscosity of the composition and the properties of the paper. In these examples, the coated papers have good properties but the compositions are highly viscous.

Table 11

| | M/A (Mole ratio) | Viscosity of composition (cps) | White paper test | | |
|---|---|---|---|---|---|
| | | | Gloss (Gs 75%) | Whiteness (%) | Opacity (%) |
| Comp. Ex. 14 | 2/100 | 800 | 68 | 92 | 96 |
| Ex. 16 | 5/100 | 200 | 68 | 92 | 96 |
| Ex. 17 | 200/100 | 120 | 68 | 92 | 96 |
| Comp. Ex. 15 | 300/100 | 1000 | 68 | 92 | 96 |

EXAMPLES 18 AND 19

Two kinds of calcium carbonate powders composed of cubic particles of 0.15 μm in average size are prepared in the same manner as in Example 10 except that the AM compounds have a molecular weight of 1000 (Example 18) and a molecular weight of 20,000 (Example 19), respectively. In each of Examples, at least 300 tons of the pulverized product has been treated by the classifier (capacity: 2.0 t/hr.) before the device becomes inoperative.

The same paper coating composition as in Example 9 is formulated except that each of the powders obtained above is used. Coated paper is prepared in the same manner as in Example 9 with use of the composition. Table 12 shows the viscosity of the composition and the properties of the paper.

COMPARISON EXAMPLE 16

A calcium carbonate powder composed of cubic particles of 0.15 μm in average size is prepared in the same manner as in Example 10 except that the AM compound used has a molecular weight of 30,000.

The same paper coating composition as in Example 9 is formulated except that the powder obtained above is used. Coated paper is prepared in the same manner as in Example 9 with use of the composition. Table 12 shows the viscosity of the composition and the properties of the paper. Although the paper has satisfactory properties, the composition has a high viscosity.

Table 12

| | Molecular weight of AM | Viscosity of composition (cps) | White paper test | | |
|---|---|---|---|---|---|
| | | | Gloss (Gs 75%) | Whiteness (%) | Opacity (%) |
| Ex. 18 | 1000 | 70 | 68 | 92 | 96 |
| Ex. 19 | 20000 | 200 | 68 | 92 | 96 |
| Comp. Ex. 16 | 30000 | 2000 | 68 | 92 | 96 |

REFERENCE EXAMPLE 1

A suspension containing 5% of cubic calcium carbonate particles 0.15 μm in average size is prepared in the same manner as in Example 2 except that IM is not used. The suspension is dewatered by a filter press to the greatest possible extent to obtain a paste containing 52% of solids (Specimen A).

A commercial dispersant of the sodium polyacrylate type is added to the same paste as Specimen A in an amount of 1.0 part per 100 parts of the calcium carbonate to prepare a slurry containing 52% of solids (Specimen B).

A powder of cubic calcium carbonate particles 0.15 μm in average size is prepared in the same manner as in Example 2. Water and a commercial dispersant of the sodium polyacrylate type is added to the powder in an amount of 1.0 part per 100 parts of the calcium carbonate to prepare a slurry containing 60% of solids (Specimen C).

Water is added to the powder of cubic calcium particles 0.15 μm in average size obtained in Example 10 to prepare a slurry containing 60% of solids (Specimen D).

Table 13 showing the viscosities of Specimens A to D reveals that the use of the calcium carbonate powder of this invention is effective in producing a greatly reduced viscosity.

Table 13

| Specimen | Viscosity (cps)* | Solid Conc. (wt%) | Additive |
|---|---|---|---|
| A | Unmeasurable (100,00 or higher) | 52 | No dispersant |
| B | 5,000 | 52 | Commercial dispersant |
| C | 5,500 | 60 | IM + Commercial dispersant |
| D | 85 | 60 | IM + AM |

*Determined by B-type viscosimeter, rotor No. 1 (cps/60 rpm, 25° C.)

EXAMPLE 20

The calcium carbonate powder (referred to as "A") 0.11 μm in average particle size and obtained in Example 9 is dispersed in water to prepare aqueous slurries of varying concentrations shown in Table 14, which reveals outstanding viscosity reducing effects on highly concentrated slurries.

COMPARISON EXAMPLE 17

The calcium carbonate powder (referred to as "B") 0.11 μm in average particle size and obtained in Comparison Example 1 and the same commercial dispersant as used in Example 1 are dispersed in water to prepare aqueous slurries of varying concentrations as shown in Table 14. The amount of the dispersant is 1.0 part per 100 parts of calcium carbonate.

Table 14

| Powder | Slurry concentration (%) | Slurry viscosity (cps) |
|---|---|---|
| A | 40 | 20 |
| | 50 | 50 |
| | 60 | 100 |
| | 70 | 5,000 |
| B | 40 | 3,000 |
| | 50 | 6,000 |
| | 60 | 10,000 |
| | 70 | Unmeasurable |

What we claim is:

1. A calcium carbonate powder composition comprising:
   (i) 100 parts by weight of cubic calcium carbonate particles 0.1 to 0.3 μm in average size, and
   (ii) 0.1 to 3.0 parts by weight of a substance comprising at least one water-soluble salt of a copolymer of 100 moles of isobutylene and 80 to 150 moles of maleic anhydride, the water-soluble salt having been adsorbed by the calcium carbonate particles and having a molecular weight of 10,000 to 30,000.

2. A calcium carbonate powder composition as defined in claim 1 comprising:
   (i) 100 parts by weight of cubic calcium carbonate particles 0.1 to 0.3 μm in average size, and
   (ii) 0.1 to 1.0 part by weight of a substance comprising at least one water-soluble salt of a copolymer of 100 moles of isobutylene and 100 to 120 moles of maleic anhydride, the water-soluble salt having been adsorbed by the calcium carbonate particles and having a molecular weight of 15,000 to 20,000.

3. A process for preparing a calcium carbonate powder composition comprising adsorbing on an aqueous suspension containing 100 parts by weight of cubic calcium carbonate particles 0.1 to 0.3 μm in average size, 0.1 to 3.0 parts by weight of a substance comprising at least one water soluble salt of a copolymer of 100 moles of isobutylene and 80 to 150 moles of maleic anhydride per 100 parts by weight of the calcium carbonate, the water soluble salt having a molecular weight of 10,000 to 30,000, dewatering the mixture, drying the dewatered mixture, pulverizing the dried mixture and classifying the pulverized mixture.

4. A process for preparing a calcium carbonate powder composition as defined in claim 3 wherein said substance is about 1.2 to 1.7 times the amount to be adsorbed by the calcium carbonate powder eventually obtained, based on the weight of the calcium carbonate.

5. A calcium carbonate powder composition comprising:
   (i) 100 parts by weight of cubic calcium carbonate particles 0.1 to 0.3 μm in average size,
   (ii) 0.1 to 3.0 parts by weight of a substance comprising at least one water-soluble salt of a copolymer of 100 moles of isobutylene and 80 to 150 moles of maleic anhydride, the water-soluble salt having a molecular weight of 10,000 to 30,000, and
   (iii) 0.3 to 5.0 parts by weight of a material comprising at least one water-soluble salt of a copolymer of 100 moles of acrylic acid and 5 to 200 moles of maleic acid, the water-soluble salt having a molecular weight of 1000 to 20,000, the water-soluble salts (i) and (ii) having been adsorbed by the calcium carbonate particles.

6. A calcium carbonate powder composition as defined in claim 5 comprising:
    (i) 100 parts by weight of cubic calcium carbonate particles 0.1 to 0.3 μm in average size,
    (ii) 0.1 to 1.0 part by weight of a substance comprising at least one water-soluble salt of a copolymer of 100 moles of isobutylene and 100 to 120 moles of maleic anhydride, the water-soluble salt having a molecular weight of 15,000 to 20,000, and
    (iii) 0.5 to 1.5 parts by weight of a material comprising at least one water-soluble salt of a copolymer of 100 moles of acrylic acid and 30 to 100 moles of maleic acid, the water-soluble salt having a molecular weight of 2,000 to 5,000, the water-soluble salts (i) and (ii) having been adsorbed by the calcium carbonate particles.

7. A process for preparing a calcium carbonate powder composition comprising adsorbing on an aqueous suspension containing 100 parts by weight of cubic calcium carbonate particles 0.1 to 0.3 μm in average size (i) 0.1 to 3.0 parts by weight of a substance comprising at least one water soluble salt of a copolymer of 100 moles of isobutylene and 80 to 150 moles of maleic anhydride per 100 parts by weight of the calcium carbonate, the water soluble salt having a molecular weight of 10,000 to 30,000 and (ii) at least one water soluble salt of a copolymer of 100 moles of acrylic acid and 5 to 200 moles of maleic acid per 100 parts by weight of the calcium carbonate, the water soluble said having a molecular weight of 1000 to 20,000, dewatering the mixture, drying the dewatered mixture, pulverizing the dried mixture and classifying the pulverized mixture.

8. A process for preparing a calcium carbonate powder composition as defined in claim 7 wherein the water-soluble salt of isobutylene-maleic anhydride copolymer and the water-soluble salt of acrylic acid-maleic acid copolymer added are about 1.2 to about 1.7 times the amounts to be adsorbed respectively by the calcium carbonate powder eventually obtained, based on the weight of the calcium carbonate.

9. An aqueous calcium carbonate slurry containing cubic calcium carbonate particles of 0.1 to 0.3 μm average size dispersed therein and having a low viscosity and a calcium carbonate concentration of up to 70% by weight, the slurry further containing, per 100 parts by weight of the calcium carbonate, 0.1 to 3.0 parts by weight of a substance comprising at least one water-soluble salt of a copolymer of 100 moles of isobutylene and 80 to 150 moles of maleic anhydride, the water-soluble salt having a molecular weight of 10,000 to 30,000, and 0.3 to 5.0 parts by weight of a material comprising at least one water-soluble salt of a copolymer of 100 moles of acrylic acid and 5 to 200 moles of maleic acid, the water-soluble salt having a molecular weight of 1000 to 20,000.

10. An aqueous calcium carbonate slurry as defined in claim 9 containing, per 100 parts by weight of the calcium carbonate, (i) 0.1 to 1.0 part by weight of a substance comprising at least one water-soluble salt of a copolymer of 100 moles of isobutylene and 100 to 120 moles of maleic anhydride, the water-soluble salt having a molecular weight of 15,000 to 20,000, and (ii) 0.5 to 1.5 parts by weight of a material comprising at least one water-soluble salt of a copolymer of 100 moles of acrylic acid and 30 to 100 moles of maleic acid, the water-soluble salt having a molecular weight of 2000 to 5000.

* * * * *